United States Patent [19]

Nishimura et al.

[11] Patent Number: 4,773,810
[45] Date of Patent: Sep. 27, 1988

[54] AUTOMATIC TRANSPORT SYSTEM FOR GREEN TIRES BETWEEN FORMING AND VULCANIZING PROCESSES

[75] Inventors: Seiichiro Nishimura; Toshifumi Hata; Kenji Yamashita, all of Kodaira, Japan

[73] Assignee: Bridgestone Corporation, Tokyo, Japan

[21] Appl. No.: 39,262

[22] Filed: Apr. 17, 1987

[30] Foreign Application Priority Data

Apr. 25, 1986 [JP] Japan ................... 61-94860

[51] Int. Cl.$^4$ ............................................. B65G 1/10
[52] U.S. Cl. .................................... 414/331; 414/226; 414/110; 414/71; 414/286; 414/281; 414/277; 414/495; 414/749; 414/908; 414/911; 414/136
[58] Field of Search ............. 414/331, 110, 134, 135, 414/70, 71, 222, 225, 226, 286, 281, 282, 277, 273, 274, 275, 266, 267, 749, 495, 460, 908, 911, 136

[56] References Cited

U.S. PATENT DOCUMENTS

| | | | |
|---|---|---|---|
| 2,696,920 | 12/1954 | Anjeskey | 414/908 X |
| 3,042,334 | 7/1962 | Erskine | 414/908 X |
| 3,796,327 | 3/1974 | Meyer et al. | 414/222 |
| 4,077,245 | 3/1978 | Bauer et al. | 414/222 X |
| 4,268,219 | 5/1981 | Nakagawa et al. | 414/222 X |
| 4,515,328 | 5/1985 | Payne, Jr. | 414/331 X |
| 4,642,017 | 2/1987 | Fenn | 417/71 X |
| 4,669,047 | 5/1987 | Chucta | 414/331 X |
| 4,708,574 | 11/1987 | Conboy et al. | 414/908 X |

FOREIGN PATENT DOCUMENTS

| | | | |
|---|---|---|---|
| 51-123286 | 10/1976 | Japan . | |
| 51-126275 | 11/1976 | Japan . | |
| 0175604 | 10/1982 | Japan | 414/273 |
| 62-53806 | 3/1987 | Japan . | |
| 62-55124 | 3/1987 | Japan . | |
| 62-79731 | 5/1987 | Japan . | |
| 62-280105 | 12/1987 | Japan . | |
| 62-290509 | 12/1987 | Japan . | |

Primary Examiner—Frank E. Werner
Attorney, Agent, or Firm—Sughrue, Mion, Zinn, Macpeak and Seas

[57] ABSTRACT

An automatic transport system for green tires between a forming process and a vulcanizing process in a tire manufacturing installing in which different kinds of tires are manufactured through a forming process of making use of a plurality of forming machines and a subsequent vulcanizing process making use of a plurality of vulcanizing machines. The automatic transport system comprises pallets each adapted to be charged with four or more formed green tires and to be used for transporting them as one unit. A temporary storage is interposed between a forming machine group and a vulcanizing machine group for temporarily storing the pallets at predetermined locations. Forming side unmanned transport trucks circulate between the forming machine group and the temporary storage with the pallet loaded thereon. Vulcanizing side unmanned transport trucks circulate between the temporary storage and the vulcanizing machine group with the pallet loaded thereon. Associated with the respective forming machines, a device places green tires into the pallet and loads the pallet onto the forming side unmanned transport truck. Associated with the respective vulcanizing machines, a device unloads the pallet from the vulcanizing side unmanned transport truck and discharges green tires from the pallet. Associated with the temporary storage, a device carries a green tires from the forming side unmanned transport truck, and associated with the temporary storage another device carries green tires onto the vulcanizing side unmanned transport truck. A control system controls travel of the forming side unmanned transport truck and the vulcanizing side unmanned transport truck in response to truck demands issued form the respective forming machines and vulcanizig machines, independently of each other.

5 Claims, 7 Drawing Sheets

AUTOMATIC TRANSPORT SYSTEM FOR GREEN TIRES BETWEEN FORMING AND VULCANIZING PROCESSES

BACKGROUND OF THE INVENTION

1. Field of the Invention

The present invention relates to a transport system for green tires between forming and vulcanizing processes in a tire manufacturing installation in which tires are manufactured through a forming process and a vulcanizing process.

2. Description of the Prior Art

In the prior art also, examples in which transportion of green tires between forming and vulcanizing processes was automated (Laid-Open Japanese Patent Specifications Nos. 51-123286 and 51-126275) are known.

With respect to these known examples in the prior art, brief explanation will be made with reference to FIG. 9 which shows a transport system for green tires.

Reference characters $a_1$, $a_2$, . . . designate forming machines for respectively forming green tires of different sizes, and storage $c_1$, $c_2$, . . . corresponding to the respective forming machines are provided in one end portion of a transport line d.

Green tires carried out from the storage are transported and mounted to respective vulcanizing machines $b_1$, $b_2$, . . . provided with press molds of predetermined sizes, by means of transport trucks e.

The above-mentioned operations are controlled by a concentrated controller in which correspondence relations between the respective storage location and particular vulcanizing machines as well as necessary time for transport are preset, and the transport is commenced in response to a transport demand signal issued from a vulcanizing machine.

As described above, in the known example in the prior art, green tires are transported along a looped track from a storage location and to a vulcanizing machine are made to correspond to each other. It is thus, necessary that a vulcanizing time in a vulcanizing machine is synchronized with a time required for carrying out green tires from a storage.

Here it is to be noted that a vulcanizing machine is made to correspond to a storage location, and this is equivalent to that a vulcanizing machine is made to correspond to a forming machine, hence a discrepancy in timing would occur between a forming machine and a vulcanizing machine because their cycle times are generally different, and if the discrepancy becomes large, there occurs an inconvenience in that synchronization cannot be established between the vulcanizing time and the time for carrying out from the storage.

More particularly, if the number of green tires in the storage location become small, then green tires cannot be transported within a required time and so a standby time would occur in the vulcanizing machine. If the storage becomes full, then the forming machine would take a standby state.

In this way, there is a fear that working efficiencies of the vulcanizing machine, the forming machine and the other associated equipment would be greatly lowered.

Such a situation would be liable to occur when a change of production volumes for the respective kinds of tires has arisen, and if this deficiency, is to reduced the number of green tires stored in the storage must be increased, and hence a larger space is required therefor.

Moreover, in view of the general layout, the respective forming machines would be provided with storage equipment, and so generally a large space is necessitated.

In addition, since the track for transporting green tires in the prior art was designed in a structure so as to transport about one or two green tires (in the specification of the prior art, two green tires are transported), in the event that many truck demands issued from the vulcanizing machine side should overlap, the transportation along the same track has a limit, and sometimes a supply of green tire within the required time would be not achieved fully, resulting in a standby state of the vulcanizing machine.

Furthermore, in order to meet the requirement for many kinds of small-amount production caused by diversification of the recent demands, it is necessary to frequently change setting conditions in the forming machines and to frequently replace press molds in the vulcanizing machines, and the timing of the change or replacement is different between the forming machines and the vulcanizing machines. Therefore, with the above-described method for transporting green tires by correlating the storage locations and the vulcanizing machines via a looped track, it is difficult to carry out the transportation so as to meet the requirement with a large flexibility.

Also, since the track must be provided between the forming station and the vulcanizing station, it is not easy to change the layout according to variations of the kinds of tires as well as the production amounts for the respective kinds, so that the system in the prior art lacks flexibility and becomes high in cost.

SUMMARY OF THE INVENTION

It is therefore one object of the present invention to provide an improved automatic transport system for green tires, which is free from the above-described shortcomings in the prior art.

A more specific object of the present invention is to provide an automatic transport system for green tires, in which the flow of green tires between forming machines and vulcanizing machines of many different kinds having different cycle times are subjected to a buffer action in the midway, so that it becomes possible to perform transport control on the forming machine side and transport control on the vulcanizing machine side independently of each other, hence working efficiencies of the respective working machines can be maintained high, and the system can be flexibly adapted to variations on the kinds and amounts of the tires.

According to one feature of the present invention, there is provided an automatic transport system for green tires between a forming process and a vulcanizing process, comprising pallets each adapted to be charged with four or more formed green tires and to be used for transporting them as one unit, a temporary storage interposed between a forming machine group and a vulcanizing machine group for temporarily storing the pallets at predetermined locations, forming side unmanned transport trucks for making circulatory transport between the forming machine group and the temporary storage with the pallet loaded thereon, vulcanizing side unmanned transport trucks for making circulatory transport between the temporary storage and the vulcanizing machine group with the pallet loaded thereon, carry-out means associated with the respective forming machines for charging green tires into the pallet and loading the pallet onto the forming side unmanned transport truck, carry-in means associated with the respective vulcanizing machines for unloading the pallet from the vulcanizing side unmanned transport truck and discharging green tires from the pallet, carry-in means associated with the temporary storage for carrying in green tires from the forming side unmanned transport truck, carry-out means associated with the temporary storage for carrying out green tires onto the vulcanizing side unmanned transport truck, and control means for controlling the respective unmanned transport trucks, the respective carry-in and carry-out means and the temporary storage, in which the control means controls traveling of the forming side unmanned transport trucks in response to truck demands issued from the respective forming machines, controls traveling of the vulcanizing side unmanned transport trucks in response to truck demands issued from the respective vulcanizing machines, independently performs transport control for the green tires on the forming side and transport control for the green tires on the vulcanizing side, and also adjustably matches the flows of the green tires on the forming and vulcanizing sides with each other.

According to the present invention, because a temporary storage is provided between a forming process and a vulcanizing process to achieve matching between the flows of green tires on the forming side and on the vulcanizing side, perfect automation of transportation of green tires becomes possible and transport controls for the green tires on the forming side and on the vulcanizing side can be performed independently of each other. Therefore, both the forming machines and the vulcanizing machines can improve their working efficiencies and reduction of manufacturing cost can be realized.

In addition, since the transport controls are carried out on the forming side and on the vulcanizing side independently of each other, the change of the setting conditions in the forming machines and the replacement of the press molds in the vulcanizing machines can be achieved easily, hence the automatic transport system for green tires can be flexibly adapted to variations of production volumes for the respective kinds and increase or decrease of the number of kinds, and change of the layout is also easy. Accordingly, the subject automatic transport system for green tires is suitable for multiple-type small-amount production.

Moreover, since the transport of green tires is performed pallet by pallet by means of a pallet each accommodating four or more green tires, a frequency of transportation can be suppressed, a number of transport trucks can be saved, and thereby reduction of cost can be achieved. Still further, the temporary storage can be equipped at one location, and so, saving of a space also becomes possible.

The above-mentioned and other objects, features and advantages of the present invention will become more apparent by reference to the following description of the invention taken in conjunction with the accompanying drawings.

GENERAL DESCRIPTION OF THE INVENTION

Now a general construction of an automatic transport system for green tires according to the present invention will be described with reference to FIG. 1.

Figure 1:
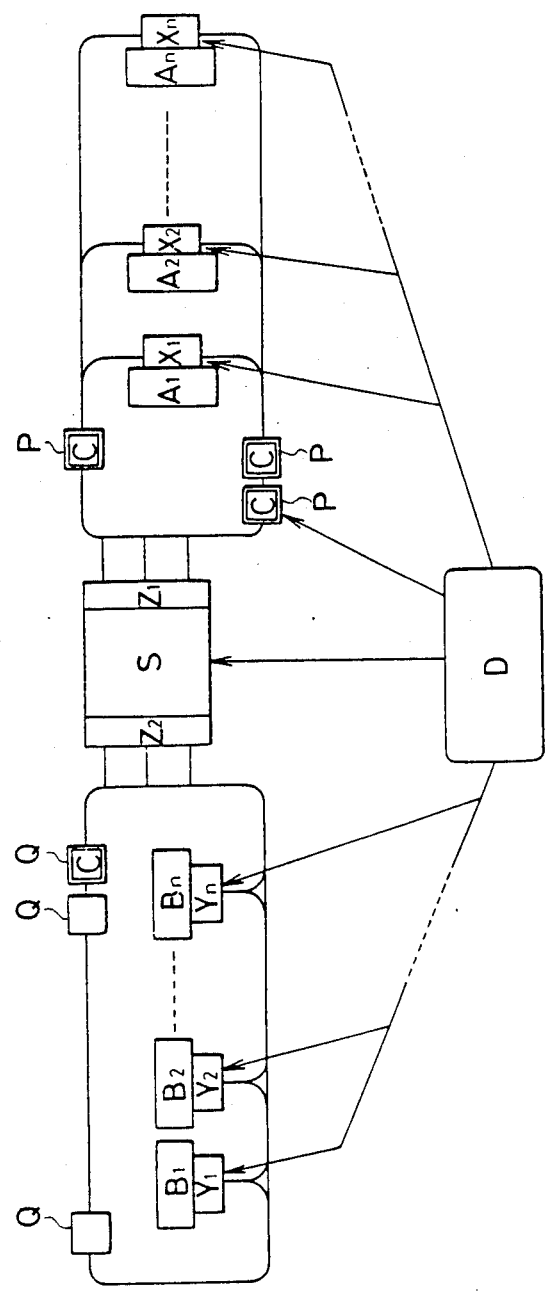
FIG. 1 is diagramatic representation of the claimed feature of the present invention.

In FIG. 1, reference characters $A_1, A_2, \ldots, A_n$ designate the respective forming machines and reference characters $B_1, B_2, \ldots, B_n$ designate the respective vulcanizing machines.

Reference character C designates a pallet adapted to be charged with four or more formed green tires and to be used for transporting them as one unit.

Reference character S designates a temporary storage location disposed between the group of forming machines $A_1, A_2, \ldots, A_n$ and the group of vulcanizing machines $B_1, B_2, \ldots, B_n$ for temporarily sorting the pallet C at predetermined locations.

Reference character P designates forming side unmanned transport trucks for making circulatory transport between the forming machine group $A_1, A_2, \ldots, A_n$ and the temporary storage S with the pallet C loaded thereon.

Reference character Q designates vulcanizing side unmanned transport trucks for making circulatory transport between the temporary storage S and the vulcanizing machine group $B_1, B_2, \ldots, B_n$ with the pallet C loaded thereon.

Reference characters $X_1, X_2, \ldots, X_n$ designate carry-out devices associated with the respective forming machines $A_1, A_2, \ldots, A_n$ which perform charging of green tires into the pallet C and loading of the pallet C onto the forming side unmanned transport truck P.

Reference characters $Y_1, Y_2, \ldots, Y_n$ designate carry-in devices associated with the respective vulcanizing machines $B_1, B_2, \ldots, B_n$, which perform unloading of the pallet C from the vulcanizing side unmanned transport truck Q and discharging of green tires from the pallet C.

Reference character $Z_1$ designates a carry-in device associated with the temporary storage S, which carries in green tires from the forming side unmanned transport truck P.

Reference character $Z_2$ designates a carry-out device associated with the temporary storage S, which carries out green tires into the vulcanizing side unmanned transport truck Q.

Reference character D designates controlling means for controlling the respective unmanned transport trucks P and Q, the respective carry-in and carry-out devices $X_1, X_2, \ldots, X_n, Y_1, Y_2, \ldots, Y_n, Z_1$ and $Z_2$.

This control means D conrols traveling of the forming side unmanned transport truck P for transporting green tires to the temporary storage S in response to truck demands issued from the respective forming machines $A_1, A_2, \ldots A_n$, and controls the temporary storage S so as to store the green tires.

Also, in response to truck demands issued from the respective vulcanizing machines $B_1, B_2, \ldots, B_n$ the control means D conrols the temporary storage S so as to carry out green tires therefrom and conrols traveling of the vulcanizing side unmanned transport truck Q so as to supply green tires of the corresponding size to the vulcanizing machine. In this way transport control of green tires on the forming side and transport control of green tires on the vulcanizing side are performed independently of each other, and the respective flows of green tires on the forming side and on the vulcanizing side are adjustably matched with each other in the temporary storage S.

Since the automatic transport system for green tires according to the present invention is constituted in the above-described manner, the transport controls for green tires on the forming side and on the vulcanizing side are independent of each other and not influenced by each other. Hence, the both working machines do not have a standby period and can maintain the maximum working efficiency.

Furthermore, the temporary storage can be installed at one location, and so, it is possible to save space.

Since transportation is performed pallet by pallet by making use of pallets each accommodating four or more green tires, a frequency of transportation can be reduced, hence the transportation is allowed to have a margin, and a standby state would not occur in the working machine.

Moreover, since transport control is performed independently of each other on the forming side and on the vulcanizing side, it is easy to change setting conditions in the forming machine and to replace a press mold in the vulcanizing machine. The system can be flexibly adapted to variation of demands, and change of the layout can be also achieved easily.

DESCRIPTION OF THE PREFERRED EMBODIMENT

Now description will be made on one preferred embodiment of the present invention illustrated in FIGS. 2 through 8.

Figure 2:
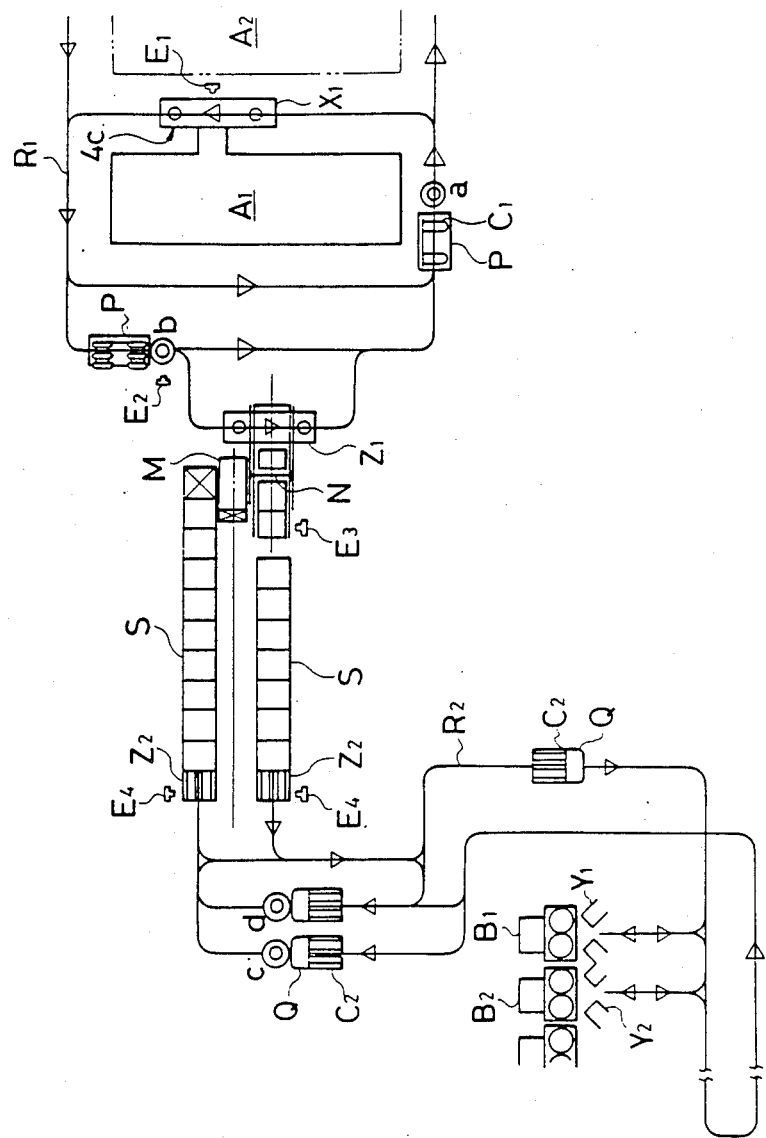
FIG. 2 is a schematic plan view of the entire automatic transport system according to the present invention.

FIG. 2 is a schematic plan view of the entire automatic transport system according to one preferred embodiment of the present invention.

In this figure, the part shown on the right side is a forming process, while the part shown on the left side is a vulcanizing process, and a temporary storage is interposed therebetween.

In the forming process, a plurality of forming machines $A_1, A_2, \ldots, A_n$ perform forming of green tires of different kinds, respectively (some of the forming machines may perform forming of green tires of the same kind).

Pallet delivery stations $X_1, X_2, \ldots, X_n$ are associated with the respective forming machines $A_1, A_2, \ldots, A_n$ respectively, and in each of the stations,an empty pallet $C_1$ is unloaded from an unmanned transport truck P and a full pallet $C_1$ (a palette charged with green tires) is loaded on the unmanned transport truck P in place of the empty pallet $C_1$ to transport the full pallet $C_1$.

Reference character $R_1$ designates a transport route for the unmanned transport trucks P.

In the vulcanizing process, a plurality of valcanizing machines $B_1, B_2, \ldots, B_n$ include different kinds of press molds, respectively, to vulcanize green tires and pallet delivery stations $Y_1, Y_2, \ldots, Y_n$ are associated with the respective vulacnizing machines $B_1, B_2, \ldots, B_n$.

Reference character $R_2$ designates a transport route for the unmanned transport trucks Q.

In the temporary storage, three-dimensional shelves S for temporarily storing formed green tires are provided in two parallel raws, and a stacker crane M travels in the space between the three-dimensional shelves S to perform storage of a pallet $C_2$ into a shelf section in the three-dimensional shelves S and removal of the pallet $C_2$ therefrom.

In a green tire carry-in section on the right side of the three-dimensional shelves S is provided a pallet delivery station $Z_1$, and there is interposed a transfer crane N between this pallet delivery station $Z_1$ and the stacker crane M.

In addition, in a green tire carry-out section on the left side of the three-dimensional shelves S are provided storage access points $Z_2$ at the ends of the respective three-dimensional shelves S.

Under the above-described construction, at first , green tires formed by the forming machine Ai are charged in the pallet $C_1$ at the pallet delivery station Xi, the transport truck P receives the full pallet $C_1$ at the same pallet delivery station Xi and transports it to the pallet delivery station $Z_1$ of the three-dimensional shelves S, the green tires charged in the pallet $C_1$ are transferred to and accommodated in another pallet $C_2$ by the transfer crane N, and further, this pallet $C_2$ is stored in the three-dimensional shelves S by the stacker crane M.

In response to a demand issued from the vulcanizing machine Bi, the temporarily stored full pallet $C_2$ is loaded on the transport truck Q on the side of the vulcanizing machines at the storage access point $Z_2$, and is transported to the pallet delivery station Yi associated with the predetermined vulcanizing machine Bi.

After the green tires have been supplied to the vulcanizing machine Bi at the corresponding pallet delivery station Yi, the empty pallet $C_2$ is again returned to the three-dimensional shelves S by the transport truck Q.

In the transportation of green tires as described above, the transport truck P at a standby position a on the transport route $R_1$ travels in response to a truck demand issued from a forming machine, and also the transport truck P at a second standby position b travels in response to a carry-in demand from the side of the three-dimensional shelves S.

Also the transport truck Q at a standby position d on the transport route $R_2$ travels in response to a truck demand issued from a vulcanizing machine.

The transport control for green tires will be described later, and now description will be made on carry-in and carry-out means at the respective locations.

Figure 3:
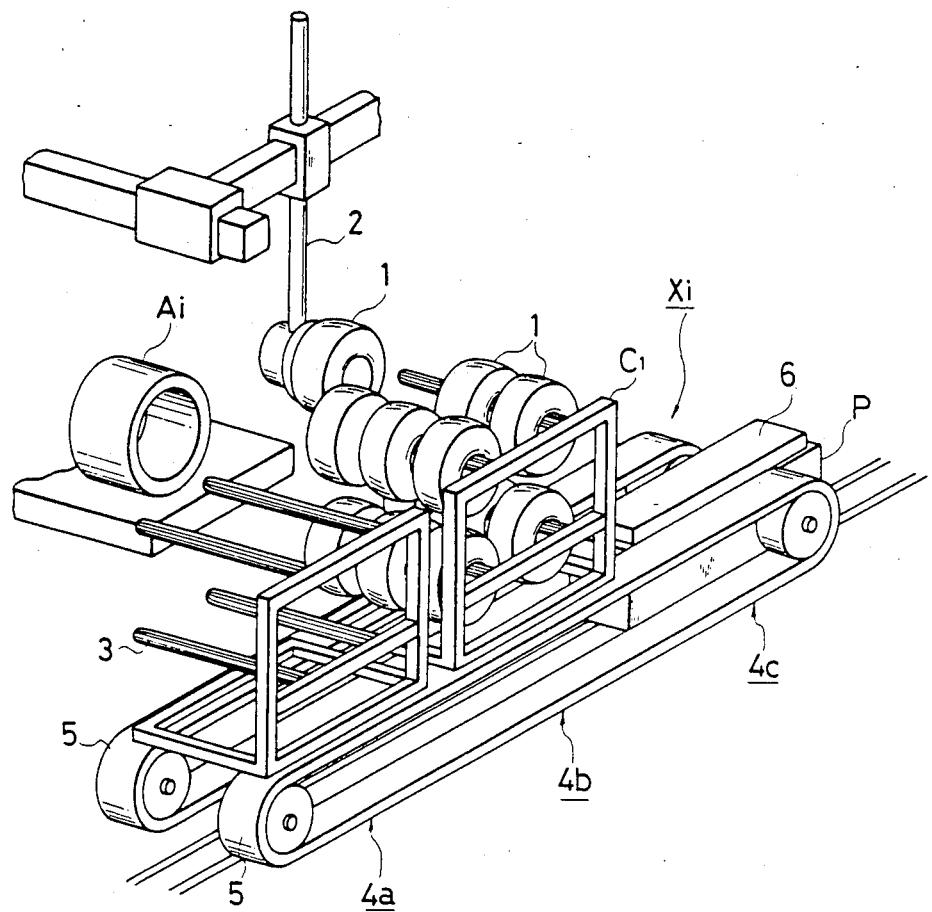
FIG. 3 is a perspective view of a pallet delivery station associated with a forming machine.

FIG. 3 is a perspective view of a part of a forming machine and a pallet delivery station associated therewith.

Green tires 1 formed by a forming machine Ai are charged into a pallet $C_1$ by means of a charging crane 2 prepared at a pallet delilvery station Xi .

In the pallet $C_1$, four forks 3 are projected as directed in the horizontal direction, and three green tires are adapted to be suspended by each of the forks 3, so that 12 green tires can be accommodated in one pallet.

The pallet delivery station $X_i$ is divided into an empty pallet placing section 4a, a green tire charging section 4b and a full pallet loading section 4c sequentially in the direction of traveling of the transport truck, two conveyor belts 5 are disposed in parallel to each other with a predetermined interval maintained therebetween as extending over the respective sections and a transport truck P is adapted to pass through the space between the conveyor belts 5.

A loading table 6 of the transport truck P is movable in the vertical direction, and the pallet $C_1$ is placed on the loading table 6 to be transported, in a state that the opposite side portions of the pallet $C_1$ project from the transport truck P to the opposite sides.

In the green tire charging section 4b, a pallet $C_1$ that is being charged with green tires 1 by the charging crane 2 is placed on the conveyor belts 5, and so, when charging of green tires into that pallet $C_1$ has been completed, the conveyor belts 5 are driven jointly with the empty pallet at the empty pallet placing section 4a to transfer the full pallet $C_1$ to the full pallet loading section 4c and to transfer the empty pallet $C_1$ to the green tire loading section 4b, and charging of green tires into that empty palette $C_1$ is commenced.

Also, concurrently with the completion of the charging of green tires at the section 4b, a transport demand is issued. In response to this transport demand a transport truck P loaded with an empty pallet $C_1$ starts from the standby position a and comes to the empty pallet placing section 4a in the pallet delivery station $X_i$, where the empty pallet $C_1$ can be placed on the conveyor belts 5 with the bottom surfaces of its both side edge portions coming into contact with the conveyor belts 5 by lowering the preliminarily raised loading table 6. The transport truck P per se travels up to the full pallet loading section 4c and stops there.

Then, the full pallet $C_1$ which has been preliminarily transferred to the full pallet loading section 4c is loaded on the transport truck P to be transported.

In the above-described manner, reloading of a full pallet in place of an empty pallet is effected at the pallet delivery station $X_i$.

Next, description will be made on the temporary storage with reference to FIGS. 4 and 5.

As described above, the full pallet $C_1$ accommodating green tires 1 is loaded on the transport track P at the full pallet loading section 4c of the pallet delivery station $X_i$ and comes to the pallet delivery station $Z_1$.

The pallet delivery station $Z_1$ is similar to the pallet delivery station $X_i$ associated with the above-described forming machine $A_i$. It consists of a pallet carry-in section 10a, a green tire recharging section 10b and a pallet carry-out section 10c. A pair of left and right conveyor belts 11 are provided extending over the respective sections.

The transport truck P transports the full pallet C1 accommodating green tires to the pallet carry-in section 10a, where by lowering the loading table 6 the pallet $C_1$ can be placed on the conveyor belts 11 with the left and right side edge portions coming into contact with the conveyor belts 11.

The placed pallet $C_1$ is transferred to the green tire recharging section 10b by the conveyor belts 11, while the transport truck P passes under the pallet $C_1$ at the recharging section 10b and comes to the pallet carry-out section 10c.

At the pallet carry-out section 10c, the transport truck P receives the empty pallet $C_1$, which has been transferred by the conveyor belts 11, by raising the loading table 6, and carries out the empty pallet $C_1$.

Figure 4:
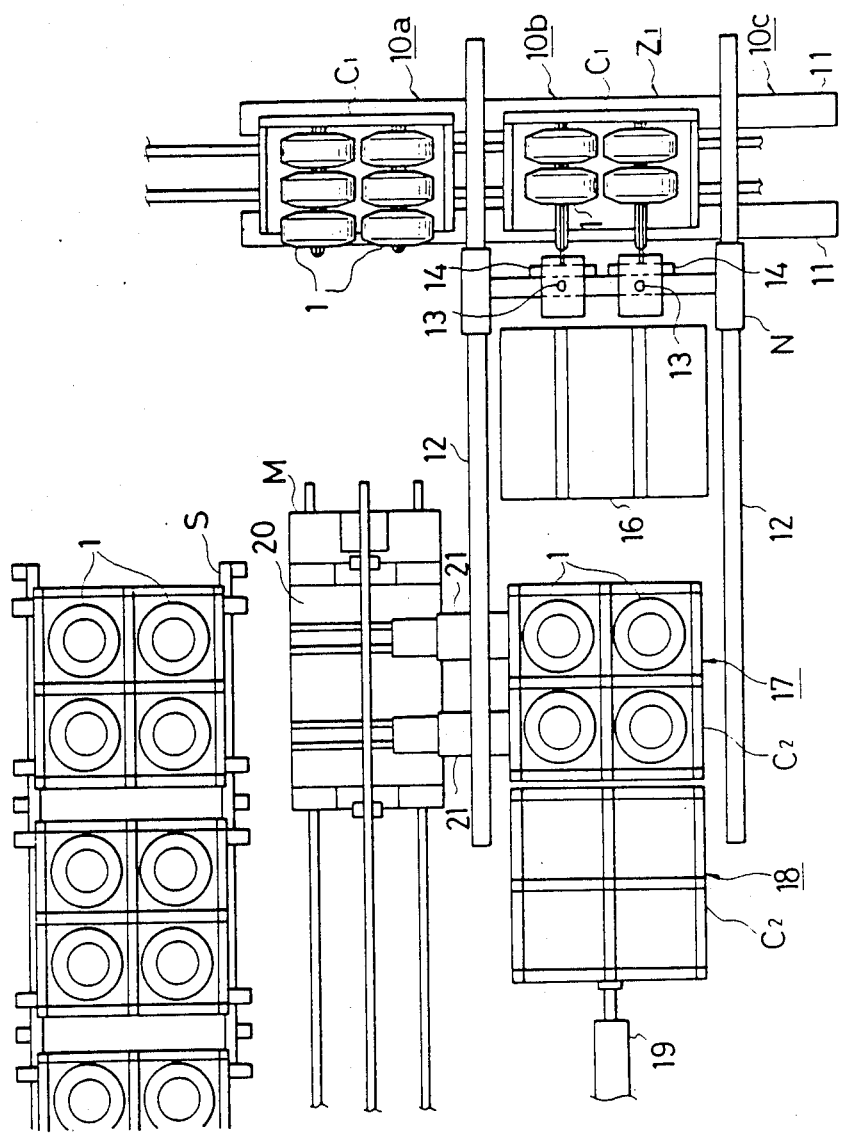
FIG. 4 is a plan view of a green tire carry-in section of a temporary storage.

The transfer crane N is slidably mounted to two ceiling rails 12 directed horizontally in the left-right direction as viewed in FIG. 4, and it comprises two vertical shafts 13 supported so as to be vertically movable, chucks 14 which are swingably mounted to the tip ends of the shafts 13. Expansible and contractible grip claws 15 provided in the chucks 14.

Figure 5:
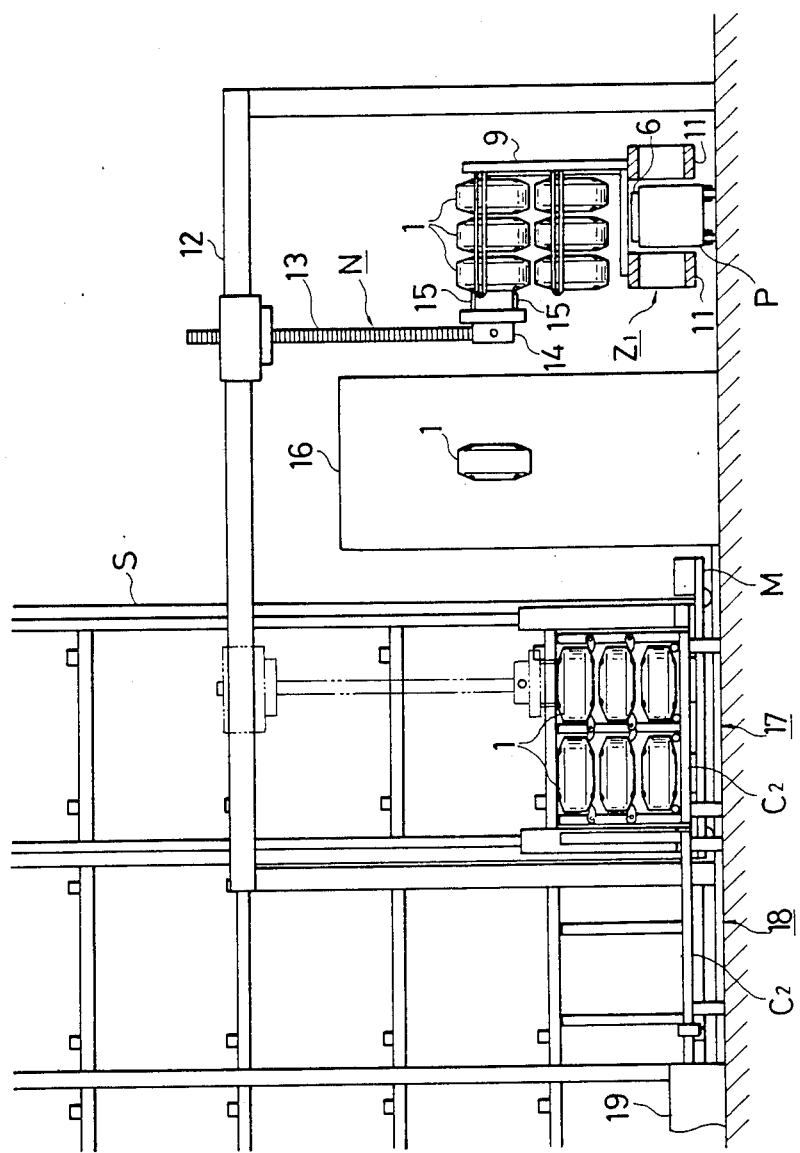
FIG. 5 is a front view of the same.

The grip claws 15 directed in the horizontal direction by swinging the chuck 14 grip the green tire 1 supported on a fork 3 of the full pallet $C_1$ positioned at the green tire reloading section 10b in the above-described pallet delivery station $Z_1$ (See FIG. 5). Then the transfer crane N itself is made to travel leftwards to disengage the green tire from the fork 3.

After the green tire has been subjected to predetermined processing by a working machine 16, the transfer crane N is made to travel by itself and come to a recharging point 17, where the chuck 14 is made to swing by 90 degrees to support the green tire at a horizontal attitude.

At the recharging point 17 an empty pallet $C_2$ is prepared. On this pallet $C_2$ three green tires 1 for each are stacked horizontally at four locations adjacent to each other in the front-rear and left-right directions (It is to be noted that this pallet $C_2$ is separable in the left and right directions as will be described later). The recharging crane N would repeat the work of recharging green tires 1 from the pallet $C_1$ via the working machine 16 to the pallet $C_2$ two by two.

Once a predetermined number of green tires 1 have been accommodated in the pallet $C_2$, the pallet $C_2$ is raised by a fork 21 projected forwards from a loading table 20 of the stacker crane M which has been brought to the side of the recharging point 17, and is loaded on the stacker crane M.

When the full pallet $C_2$ has been loaded on the stacker crane M at the recharging point 17, an empty pallet $C_2$ is already prepared by the stacker crane M at a pallet preparation point 18 adjacent to the recharging point 17. Provision is made such that the empty pallet $C_2$ is pushed out to the recharging point 17 by a pushing machine 19 disposed on the left of the pallet preparation point 18.

The stacker crane M travels through the space between two rows of three-dimensional shelves S which are erected with their front faces opposed to each other. Since the loading table 20 is movable in the vertical direction, the loading table 20 can be brought to a position adjacent to the front face of a predetermined shelf section in the three-dimensional shelves S, and can store or take out the pallet $C_2$ in or from the shelf section by means of the expansible and contractible fork 21.

At a storage access point $Z_2$ which is a carry-out section of the temporary storage for carrying out green tires from the storage to the vulcanizing side, the full pallet $C_2$ is carried out by the stacker crane M, or an empty pallet $C_2$ carried from the vulcanizing machine by the transport truck Q is unloaded.

Now description will be made on the pallet delivery station $Y_i$ associated with the vulcanizing machine $B_i$ with reference to FIGS. 6 and 7.

Figure 6:
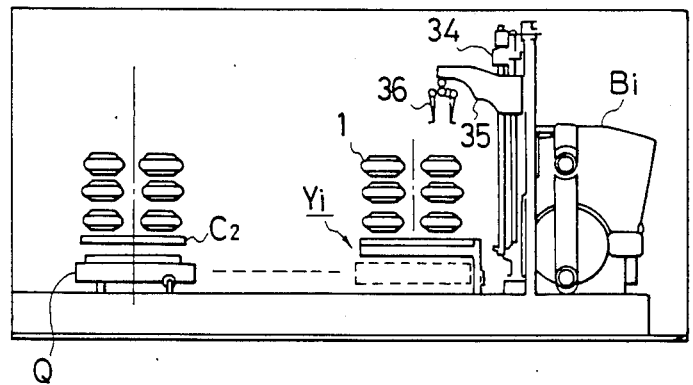
FIG. 6 is a side view of a vulcanizing machine and a pallet delivery station associated therewith.

FIG. 6 is a side view of the pallet delivery station $Y_i$ and the vulcanizing machine $B_i$. The full pallet $C_2$ carried by the transport truck 9 is automatically mounted to the pallet delivery station $Y_i$. The pallet delivery station $Y_i$ consists of left and right frames 30 and 31, and the left and right frames 30 and 31 can be swung horizontally about a pivot 33 by an air cylinder 32 so as to be expanded as shown in FIG. 7.

At the respective ends of the front faces of the vulcanizing machine Bi are provided loaders 34, in which grip claws 36 extending vertically downwards are provided at tip ends of arms 35 which are vertically slidable and horizontally swingable.

Figure 7:
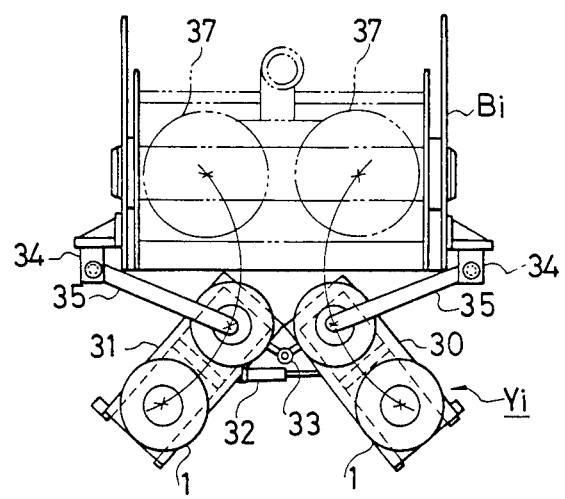
FIG. 7 is a plan view of the same.

As shown in FIG. 7, under the condition where the frames 30 and 31 are expanded, each of the tip ends of the left and right arms 35 exists on a circumference passing through the center axes of the green tires 1 loaded on the corresponding frame and the center axis of the corresponding press mold 37 in the vulcanizing machine Bi. Accordingly, the arm 35 is appropriately swung and moved vertically to grip the green tire 1 in the expanded pallet $C_2$ by the grip claws 36. Thereby the green tire 1 can be taken out and mounted in the press mold 37. It is to be noted that the details of the pallet $C_2$ and the pallet delivery station Yi will be apparent by reference to the specification and drawings of U.S. patent application Ser. No. 903,345 filed Sept. 3, 1986.

The green tires are transported through the above-described respective stations of the forming machines, the vulcanizing macnines and the temporary storage, and with respect to the control for the transport of them, description will be made in fhe following.

The respective ones of the pallets $C_1$ and $C_2$ are respectively labelled with pallet numbers in the form of the bar code, and they are adapted to be read by bar code readers disposed at various positions along the transport route.

In FIG. 2, at first, a bar code reader $E_1$ is disposed at the green tire charging section 4b of each of the pallet delivery stations $X_1, X_2, \ldots, X_n$ on the forming side to read the bar code of the pallet that is being charged with green tires to be carried out, and thereby correspondence between a particular pallet and a kind of green tires charged therein can be established.

A bar code reader $E_2$ is disposed at the second standby position b to read the bar code of the full pallet $C_1$ to be carried in the temporary storage. Thereby the kind of the green tires charged therein is confirmed from the above-mentioned correspondence.

At the pallet preparation point 18 of the green tire recharging section making use of the transfer crane N, also a bar code reader $E_3$ is disposed to read the bar code of the empty pallet $C_2$ carried in by the stacker crane M. Thus, correspondence between the particular empty pallet $C_2$ and the kind of green tires to be recharged therein can be established, and also correspondence between that particular pallet $C_2$ and the shelf section of the three-dimensional shelves in which that pallet $C_2$ is about to be accommodated, can be established.

At the storage access point $Z_2$ of the temporary storage, also a bar code reader $E_4$ is disposed to read the bar code of the full pallet $C_2$ to be carried out by the transport truck Q, and thereby the kind of the green tires charged therein can be confirmed from the above-mentioned correspondence.

In addition, the same bar code reader $E_4$ also read the bar code of the empty pallet $C_2$ carried in by the transport truck Q, and thereby correspondence between that particular pallet $C_2$ and the shelf section of the three-dimensional shelves in which that empty pallet $C_2$ is about to be accommodated, can be established.

The transport tracks P and Q stand by at the above-described standby positions a, c and d, and in response to a truck demand issued from the forming machine or the vulcanizing machine the transport track departs at an appropriate moment according to an instruction. The truck demands are done by demand signals issued from a counter $F_1$ (FIG. 8) provided in a charging crane 2 for charging green tires from the forming machine into the pallet $C_1$ and from a counter $F_2$ (FIG. 8) provided in a loader 34 for carrying in green tires from the pallet $C_2$ to the vulcanizing machine. The above-mentioned counters $F_1$ and $F_2$ would count the number of green tires charged into the pallet $C_1$ or discharged from the pallet $C_2$.

Figure 8:
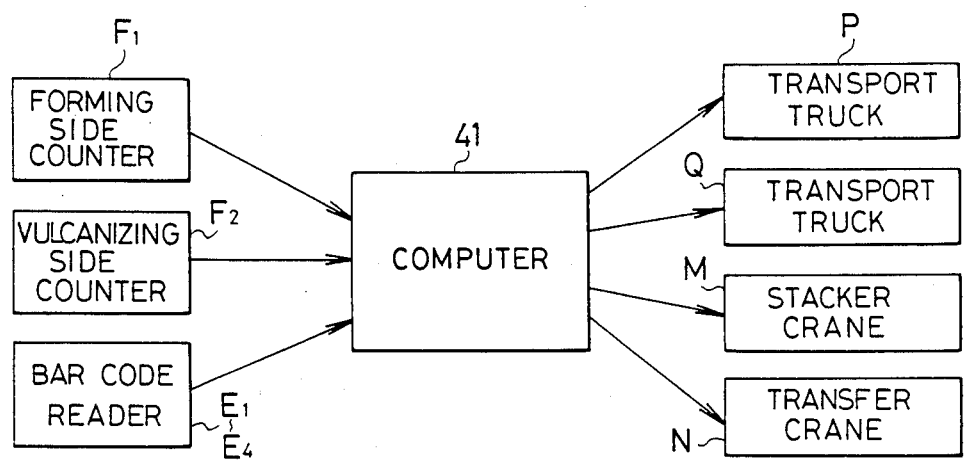
FIG. 8 is a schematic block diagram of a control system for transportation of green tires according to the present invention.
Figure 9:
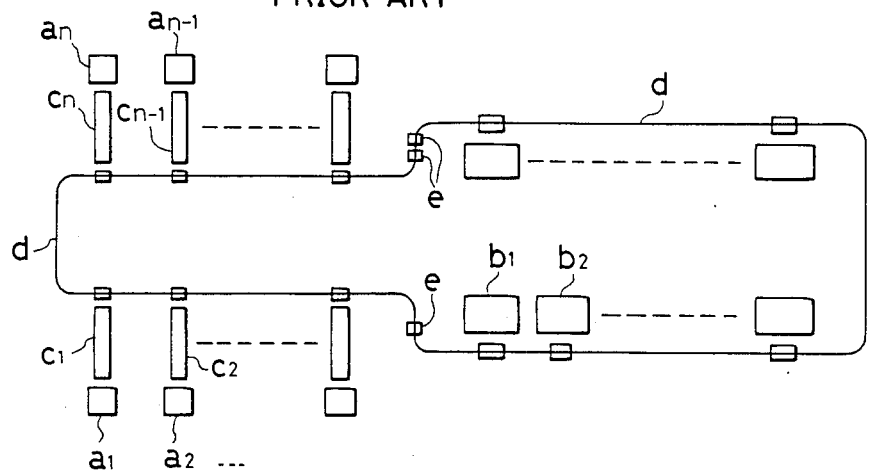
FIG. 9 is a schematic layout diagram showing a transport system for green tires in the prior art.

A schematic block diagram of a transport control system employed in the above-described embodiment is shown in FIG. 8. This contol system is entirely controlled by a computer 41. As input side means, there are provided the counter $F_1$ on the forming side, the counter $F_2$ on the vulcanizing side, the above-described bar code readers $E_1$, $E_2$, $E_3$, and $E_4$, and the like. At an output side means, there are provided the transport trucks P and Q, the stacker crane M, the transfer crane N, and the like.

The computer 41 stores a pallet number, the kind of charged tires and a number of a shelf section in which a pallet is accommodated as one set, with respect to all the empty pallets $C_2$ and the full pallets $C_2$ accommodated in the three-dimensional shelves.

Also the computer 41 stores the correspondence between a pallet and a kind of green tires charged therein with respect to the full pallets which are being transported.

Under the above-mentioned condition, if the counter $F_1$ for counting the number of charged green tires counts the instant when the charging crane 2 has charged the last green tire to the pallet $C_1$ in the pallet delivery station Xi of a certain forming machine Ai, then a truck demand signal is issued from the counter $F_1$ to the computer 41. The full pallet which has finished charging of green tires, is transported by a transport truck P which departed from the standby position a in response to an instruction.

The computer 41 calculates the latest departure time of the transport truck P by the following formula (1), taking into consideration the demand time when the truck demand signal was input thereto, a forming period for one pallet of green tires of the forming machine Ai which issued the truck demand signal, and a traveling period from the standby position a to the same forming machine Ai:

$$(\text{the latest departure time}) = (\text{demand time}) + (\text{forming period}) - (\text{traveling period}) \quad (1)$$

In the event that truck demand signals from different forming machines should overlap, the respective latest departure times are calculated by the above formula, then preference is given to the truck demands sequentially from the demand whose latest departure time is earliest, and the transport truck P is furnished according to the sequence of preference.

When the transport truck P has arrived at the forming machine Ai, forming of one pallet of green tires has been already completed and forming of the next one pallet of green tires is not yet completed. Hence, the empty pallet which has been transported by the transport truck P is transferred to the empty pallet placing section 4a of the pallet delivery station Xi, and the transport truck P immediately advances up to the full pallet loading section 4c, and can transport the full pallet $C_1$ on the full pallet loading section 4c with that pallet $C_1$ loaded thereon. Therefore, wasteful time is not present, a waiting period does not occur in the forming machine, and transportation can be effected efficiently.

This full pallet $C_1$ has its pallet number read by the bar code reader $E_1$ at the green tire charging section 4b in the pallet delivery station Xi, and hence, correspondence between the pallet number and the type of the charged green tires is established and stored in the computer 41.

The transport track P loaded with the full pallet $C_1$ arrives at the second standby position b and waits for an instruction to carry into the three-dimensional shelves S.

In order to control the stacker crane M, the computer 41 read in the pallet number of the full pallet $C_1$ loaded on the transport truck P by means of the bar code reader $E_2$ disposed at the second standby position b, thereby confirms the kind of the charged green tires. When the computer 41 has judged that it is possible to carry in the green tires to the three-dimensional shelves S, a carry-in instruction is given to the transport truck P waiting at the standby position b to travel up to the pallet delivery station $Z_1$.

In the pallet delivery station $Z_1$, green tires are recharged from the pallet $C_1$ to the pallet $C_2$ which has been already prepared at the recharging point 17 by means of the transfer crane N.

The computer 41 establishes correspondence between the pallet number of the particular pallet $C_2$ which was read in by the bar code reader $E_3$ and the type of the recharged green tires as well as the correspondence between the pallet number and a number of a shelf section where the pallet is to be stored. According to such correspondence, the stacker crane M stores the full pallet $C_2$ in the predetermined shelf section of the three-dimensional shelves S.

The transport truck P which has transported the full pallet $C_1$ to the pallet delivery station $Z_1$, returns again to the standby position a with the emptied pallet $C_1$ loaded thereon.

In the above-described transporation of green tires on the forming side, sequential transport control is effected under preference based on the demand signals issued from the respective forming machines, and independent control is performed without being influenced by the vulcanizing side.

Because the green tires are temporarily stored in the three-dimensional shelves, adjustable matching can be done between the flows of green tires on the sides of the forming machines and the vulcanizing machines which have different cycle times.

Moreover, since empty pallets as well as full pallets accommodating green tires of different kinds are stored in the three-dimensional shelves S as mixed with one another, the space required for installation can be greatly saved.

In addition, even in the event that production of a certain kind of tires has been increased or decreased as compared to the other kinds of tires due to variation of demands, the temporary storage can be used as it is without changing the layout adding to flexibility.

Now, description will be made on the transport control on the vulcanizing side which is somewhat different from the transport control on the forming side.

At first, when the counter $F_2$ adapted to count the number of green tires mounted to the vulcanizing machine has counted the moment when the loader 34 provided in the vulcanizing machine Bi takes out the last green tires from the pallet $C_2$, the counter $F_2$ transmits a truck demand signal to the computer 41.

In response to the truck demand signals, the computer 41 gives preference to the respective demands on the basis of the latest departure time calculated by the following formula (2):

(the latest departure time)=(demand time)+(vulcanizing period)−(traveling period)  (2)

It is to be noted that on the vulcanizing side, the traveling period is a period including the period when the transport truck Q receives the full pallet $C_2$ at the storage access point $Z_2$ of the temporary storage.

According to the preference, first the computer 41 sends an instruction for recovering an empty pallet to a transport truck Q that is waiting at the standby position d and has no pallet.

At the same time, the computer 41 instructs the stacker crane M to take out a full pallet $C_2$ charged with adequate green tires, and simultaneously with the removal, it sends an instruction to the other transport truck Q waiting at the standby position d to receive the full pallet $C_2$ at the storage access point $Z_2$ and transport it to the vulcanizing machine Bi.

The transport truck Q instructed to recover the above-described empty pallet, recovers the empty pallet $C_2$ at the pallet delivery station Yi in front of the designated vulcanizing machine Bi, then comes to a standby position C and waits for an instruction to carry the empty pallet into the three-dimensional shelves. And, if an instruction for carrying in is issued, the transport truck Q carries the empty pallet $C_2$ to the storage access point $Z_2$, and then delivers the empty pallet $C_2$ to the stacker crane M, and the transport truck Q itself comes to the standby position d and remains there.

Subsequently to the above-described transport truck Q recovering the empty pallet, the other transport truck Q is, at first, loaded with the full pallet $C_2$ at the storage access point $Z_2$ of the temporary storage, and thereafter transports the full pallet $C_2$ to a designated vulcanizing machine Bi. It then places the full pallet $C_2$ at the pallet delivery station Yi, where the first-mentioned transport truck Q has already recovered the empty pallet $C_2$, and returns to the standby position d.

As described above, on the vulcanizing side, since the pallet delivery station has only a space corresponding to one pallet, recovery of an empty pallet and transport of a full pallet are performed by two transport trucks Q.

It is to be noted that if the pallet delivery station Yi is modified to a station where loading of an empty pallet and unloading of a full pallet can be achieved simultaneously as is the case with the pallet delivery station Xi on the forming side, or if the transport truck has two loading tables, the processing can be done by one transport truck Q.

As described above, also on the vulcanizing side, since sequential transport control is effected with preference based on the truck demand signals issued from the respective vulcanizing machines, independent contol can be achieved without being influenced by the forming side.

In this way, in the above-described embodiment, since transport controls for green tires are independent between the forming side and the vulcanizing side and are not influenced by each other, the respective forming machines and vulcanizing machines can fully work, and so, the working efficiency is excellent.

These mutually independent flows of green tires are matched with each other by the temporary storage interposed therebetween, correspondence is established among the kind of green tires, the pallet number and the shelf section number as one set, the empty and full pallets are stored in the respective shelf sections, and computer control is effected, so that a satisfactory temporary storage effect (a buffer effect for the flows of green tires) can be attained while the space is saved by enhancing a storage efficiency with different kinds of green tires stored as mixed together.

Because the temporary storage is computer controlled in the above-described manner, the automatic transport system for green tires according to the present invention is suitable for multiple types and small-amount production. It can be flexibly adapted to variation in the production amounts for the respective kinds of tires caused by change of demands.

In addition, since the transport controls are independent of each other on the forming side and on the vulcanizing side, a change of setting conditions in the forming machines and replacement of press molds in the vulcanizing machines are easy. Hence the system can be flexibly adapted to variations of kinds of tires to be produced.

Futhermore, by the use of transport trucks, the change of layout is facilitated.

Still further, since the traveling control for the transport trucks P and Q is effected according to preference given on the basis of the calculated latest departure time, a transport efficiency is excellent. In addition, since transportation of green tires is effected pallet by pallet by making use of pallets each capable of accommodating twelve green tires, the frequency of transportation can be reduced, a number of transport trucks can be saved, and thereby reduction of cost can be achieved.

It is to be noted that while different types of pallets are used for the pallets $C_1$ on the forming side and for the pallets $C_2$ on the vulcanizing side in the illustrated embodiment, if it is possible to make the pallet delivery stations $X_i$ and $Y_i$ in front of the forming machines $A_i$ and in front of the vulcanizing machines $B_i$ have the same construction, identical pallets can be used for the pallets $C_1$ and $C_2$.

And in the above-described modified case, if the system does not necessitate the working machine 16 associated with the temporary storage, it is also unnecessary to recharge green tires from the pallet $C_1$ to the pallet $C_2$, and so, simplification of the transport system can be achieved.

What is claimed is:

1. In a tire manufacturing installation, in which different kinds of tires are manufactured through a forming process making use of a plurality of forming machines and a subsequent vulcanizing process making use of a plurality of vulcanizing machines, an automatic transport system for green tires between said forming and vulcanizing processes; characterized in that said system comprises pallets each adapted to be charged with four or more formed green tires and to be used for transporting them as one unit, a temporary storage interposed between a forming machine group and a vulcanizing machine group for temporarily storing said pallets at predetermined locations, forming side unmanned transport trucks for making circulatory transport between said forming machine group and said temporary storage with said pallet loaded thereon, vulcanizing side unmanned transport trucks for making circulatory transport between said temporary storage and said vulcanizing machine group with said pallet loaded thereon, carry-out means associated with the respective forming machines for charging green tires into the pallet and loading said pallet onto the forming side unmanned transport truck, carry-in means associated with the respective vulcanizing machines for unloading the pallet from the vulcanizing side unmanned transport truck and discharging green tires from the pallet, carry-in means associated with the temporary storage for carrying in green tires from forming side unmanned transport truck, carry-out means associated with the temporary storage for carrying out green tires onto the vulcanizing side unmanned transport truck, and control means for controlling the respective unmanned transport truck, the respective carry-in and carry-out means and the temporary storage; and in that said control means controls traveling of said forming side unmanned transport trucks in response to truck demands issued from the respective forming machines, controls traveling of said vulcanizing side unmanned transport trucks in response to truck demands issued from the respective vulcanizing machines, independently performs transport control for the green tires on the forming side and transport control for the green tires on the vulcanizing sides with each other.

2. An automatic transport system for green tires as claimed in claim 1, characterized in that said control means includes a computer.

3. An automatic transport system for green tires as claimed in claim 2, characterized in that said computer calculates the latest departure times of the respective forming side unmanned transport trucks to be dispatched to the respective forming machines in response to truck demands issued from said forming machines, and makes the transport trucks depart sequentially from the transport truck whose latest departure time is earliest.

4. An automatic transport system for green tires as claimed in claim 2, characterized in that said computer calculates the latest departure times of the respective vulcanizing side unmanned transport trucks to be dispatched to the respective vulcanizing machines in response to truck demands issued from said vulcanizing machines, and makes the transport trucks depart sequentially from the transport truck whose latest departure time is earliest.

5. An automatic transport system for green tires as claimed in claim 2, characterized in that with respect to each of the pallets stored in said temporary storage, correspondence among a number of said pallet, the king of green tires on said pallet and a location where said pallet is stored is established and stored in said computer.

* * * * *